Dec. 29, 1959  G. MUSAPHIA  2,918,844
ANIMATED OPTICAL VIEWER
Filed Oct. 14, 1958  4 Sheets-Sheet 1

INVENTOR.
GEORGES MUSAPHIA
BY Luther Mack
Attorney

Dec. 29, 1959  G. MUSAPHIA  2,918,844
ANIMATED OPTICAL VIEWER
Filed Oct. 14, 1958  4 Sheets-Sheet 2
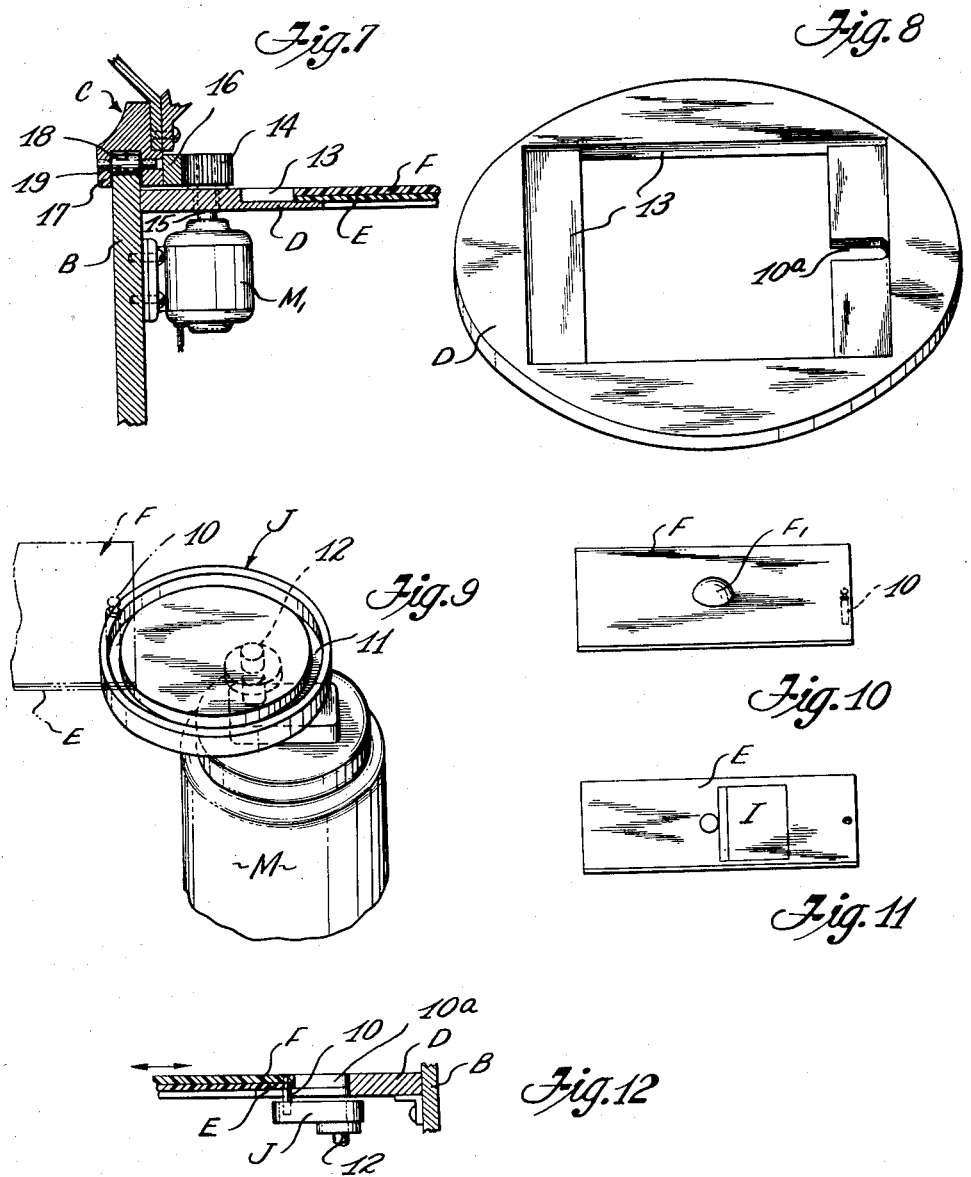
INVENTOR.
GEORGES MUSAPHIA
BY Arthur Shack
Attorney Dec. 29, 1959  G. MUSAPHIA  2,918,844
ANIMATED OPTICAL VIEWER
Filed Oct. 14, 1958  4 Sheets-Sheet 3

INVENTOR.
GEORGES MUSAPHIA
BY
Attorney

Dec. 29, 1959

G. MUSAPHIA 2,918,844

ANIMATED OPTICAL VIEWER

Filed Oct. 14, 1958

INVENTOR.
GEORGES MUSAPHIA
BY
*Luther L. Mack*
Attorney

2,918,844
Patented Dec. 29, 1959

2,918,844

ANIMATED OPTICAL VIEWER

Georges Musaphia, Newton, Mass.

Application October 14, 1958, Serial No. 769,970

9 Claims. (Cl. 88—24)

This invention relates in general to optical viewers but more particularly to a viewer which, in diversified forms, is useful for window displays and in various locations for simulating animation of a subjective image as an entertainment or advertising feature.

An important object is to provide a viewer which, because of a novel and peculiar form and arrangement of its component elements, not only simulates animation of an image, or parts thereof, but appears to suspend the animated image in space with or without a background.

Another object is to substantially enlarge the observable image, either with or without animation, to an extent where the viewed image appears to be life-size whereas the subject image is of substantially small size.

A further object is to move the projected image plane on an axis so that the image will be visible to persons from variable angles, as when used in a display window or other location.

An object, also, is to interpose a light transmitting screen between the image plane and an observer surface and to deform desired areas of the screen overlying certain portions of the image for the purpose of simulating animation of the image underlying the deformed areas as when a light is moved relative to the image, or vice versa, thereby varying the angle of incidence of light rays directed through the image and screen for viewing by an observer.

Another object is to provide means for supporting a group of images adjacent a screen, which may be simultaneously, progressively or sequentially displayed.

Other objects, features and characteristics of this invention will readily appear as the description of this means and method progresses.

There is shown in the accompanying drawings, a form of apparatus for carrying out the hereinbefore named and other objects, but it will be obvious that the apparatus and the effects of its use may be modified, within the scope of the appended claims, without deviating from the invention.

In said drawings:

Fig. 7 is an enlarged sectional view of a motivating mechanism as shown in Fig. 1 for oscillating the viewer head;

Fig. 8 is a perspective view of the image and screen carrier of Fig. 1;

Fig. 9 is a perspective view of a motivated lamp and its actuator, whereby a lamp may be moved relative to an image;

Fig. 10 is a perspective view of a detached screen;

Fig. 11 is a similar view of an image carrier;

Fig. 12 is a section on line 12—12 of Fig. 3;

Figure 16:
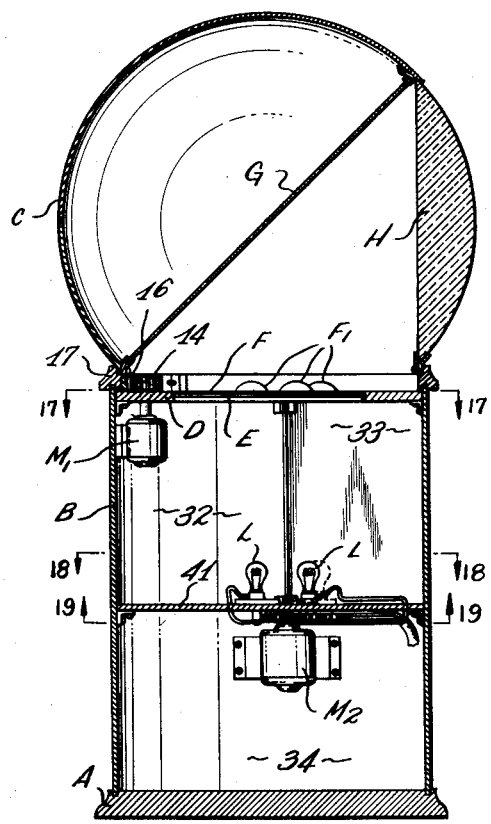
Fig. 16 shows a compartmented stand with means for supporting a group of images and for projecting the images to a common viewing plane.
Figure 17:
Figure 18:
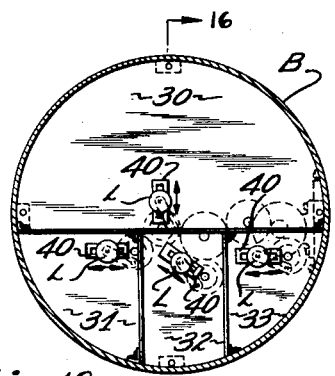
Figure 19:
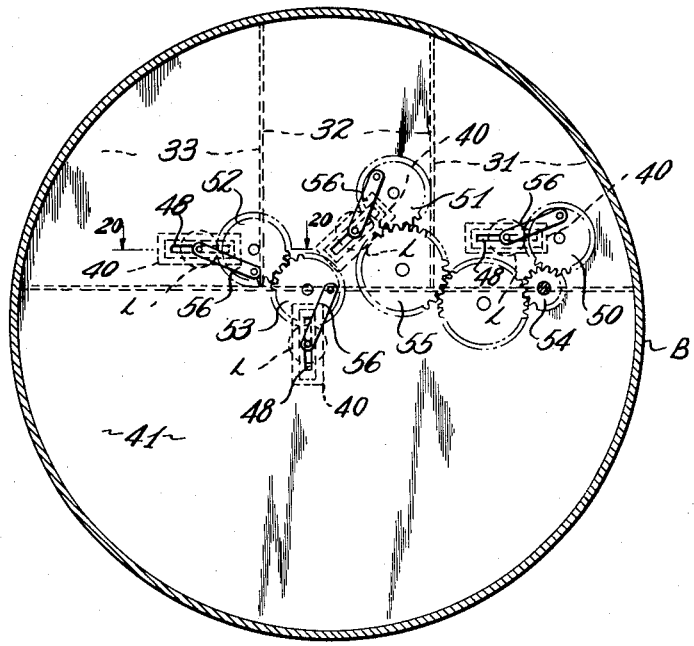
Figure 20:
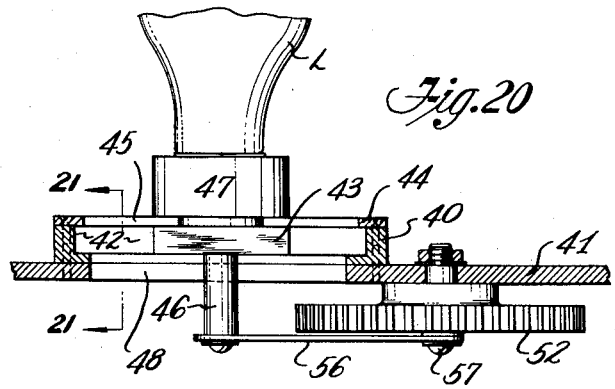
Figure 21:
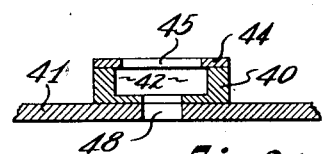

Figs. 17, 18 and 19 are, respectively, sectional views on lines 17—17, 18—18 and 19—19 of Fig. 16;

Fig. 20 is a section on the structure as seen on line 20—20 of Fig. 19;

Fig. 21 is a fragmentary section on line 21—21 of Fig. 20; and

Figure 22:
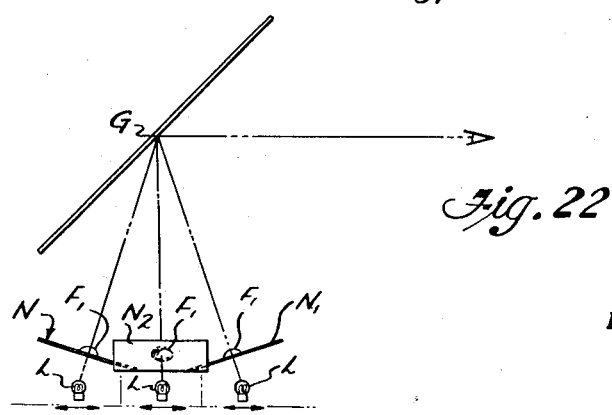

Fig. 22 is a diagram showing the angles of light rays from separate sources for focusing the rays on the lens of a unit.

Figure 1:
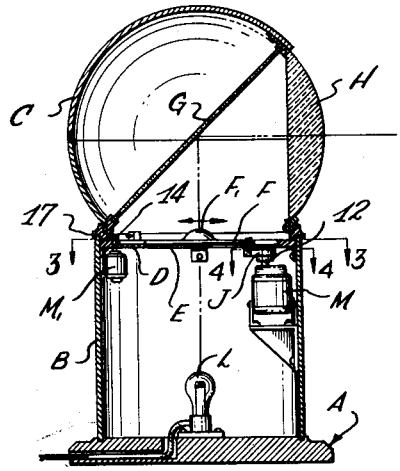
Fig. 1 is a sectional elevation of an assembled viewer with an oscillatable head.
Figure 5:
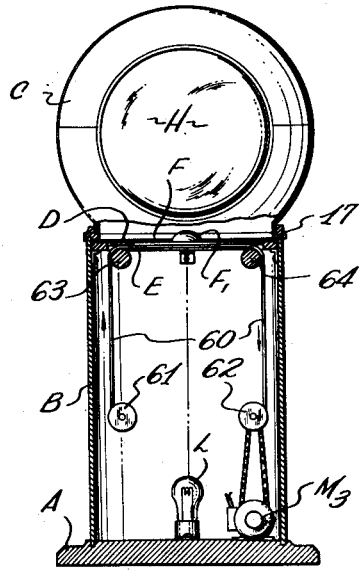
Fig. 5 is an elevational view partly in section, similar in form to the disclosure of Fig. 1, but illustrating a different type of image carrier and motivating means.
Figure 6:
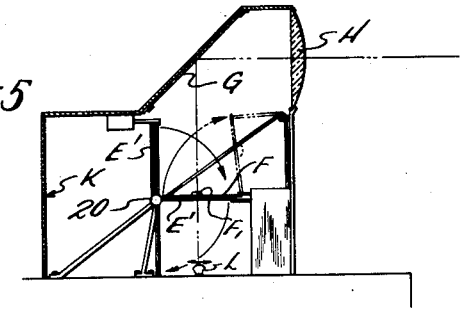
Fig. 6 shows a sectional elevation of a viewer which is arranged to intermittently present different images in position for viewing.

One form of apparatus includes a base A with a pedestal B mounted on the base and a head C stationarily or oscillatably carried on the pedestal as in Figs. 1 and 5. Base A supports a lamp L either fixedly or movably while pedestal B supports a fixed carrier D. Carrier D supports an image sheet E having an image I movable relative to lamp L and a translucent screen F. Thus, lamp L may be moved relative to image carrier E or an image I thereon, or vice versa. In Fig. 1 the lamp is stationary while the image is movable.

Screen F may have one or more deformations $F_1$ from the plane of the screen and disposed at a point or points over desired areas of the image so that, as the lamp L and image I are relatively moved—one being fixed while the other is movable—or while both elements are moved—an illusion of animation will be produced.

Head C includes a reflector G and a plano-convex lens H which serves to direct light from the lamp through image I and screen F to and thence from reflector G through lens H for viewing by observers. The deformed portions $F_1$ deflect the light rays from lamp L onto correspondingly different areas of reflector G as image I or lamp L is moved. Hence, the rays are reflected from reflector G to variable points on the flat side of lens H and are bent and the image is viewable from points in front of the convex side of the lens in enlarged size. When viewed through lens H the images having no background appear to be suspended in space, and, due to the relative movement of the source of light and the image, the image or parts thereof present an illusion of depth and movement, although the subject image is a flat picture.

For obtaining major effects, it is desirable to oscillate the head C so that observers positioned at points at angles to the focal axis of lens H may, at least intermittently, obtain the full effects of the illusion. To such end, I have provided means for oscillating the head C, reflector G and lens H to an extent of from 60 to 120 degrees, more or less, so that, when a viewer is placed in a store window, or other location, the animated picture will be easily visible to passersby as they approach, pass through and vanish from the range of the picturized influence.

Figure 4:
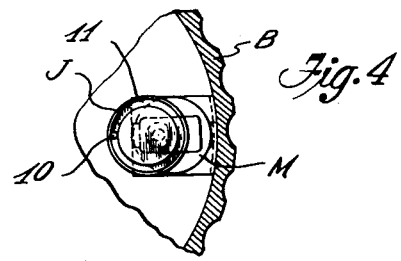
Fig. 4 is a fragmentary section in the plane of line 4—4 of Fig. 1.

At the top of pedestal B, I mount the carrier D for movably supporting the image I and screen F, or vice versa, so that the image and screen may be relatively moved, as by means of a motor M, to the spindle of which a cam or eccentric J is attached. Said carrier has a pin 10 adapted to engage in track 11 in cam J (Figs. 4 and 9) so that as motor spindle 12 rotates the image plate E will slide backwardly and forwardly on the carrier D while screen F, which overlies the image plane, will remain stationary. Carrier D and screen F, as shown, are circular, while the image plate E is movably mounted in a rectangular recess 13, carrier D having a slot 10a in which pin 10 moves, as in Fig. 8.

As shown in Fig. 7, the head C may be oscillated by a motor $M_1$ attached to pedestal B and connected by a pinion 14 on its spindle 15 with a rack 16 carried by a ring 17 of head C, which, as shown, is grooved at 18 to receive and support rollers 19 upon the upper edge of column B. Thus, continuous rotation of head C is effected, but if only oscillatory movement of the head is desired, any well known means may be employed for reversing the movement of the head C such, for instance, as conventional limit switches, or other electro-mechanical devices.

Figure 13:
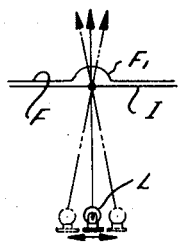
Figs. 13, 14 and 15 are diagrams showing the light rays directed at different angles from a source.
Figure 14:
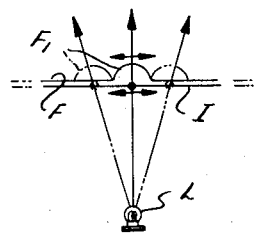
Figure 15:
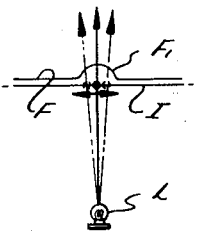

The diagrams of Figs. 13, 14 and 15 show, respectively, a stationary screen F and image I with a relatively movable lamp L; a movable screen and image and a fixed lamp; and a fixed screen, a relatively movable image and a fixed lamp. Under any of said conditions the rays of light from the light source are deflected by deformed portions $F_1$ of the screen F upon reflector G and then the image is viewable from the reflector through lens H by observers.

The form of projector shown in Fig. 5 employs reflector G and lens H, but has a housing K adapted to enclose a rotatable image carrier on which a plurality of hinged image holders E' are coaxially mounted on a spindle 20 so that as they are swung downwardly into horizontal position above a fixed lamp L, the images will be directed upon reflector G and through lens H one after another.

Figure 2:
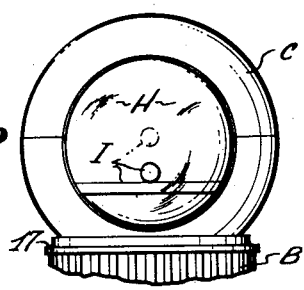
Fig. 2 is a fragmentary elevation in a plane at right angles to Fig. 1.
Figure 3:
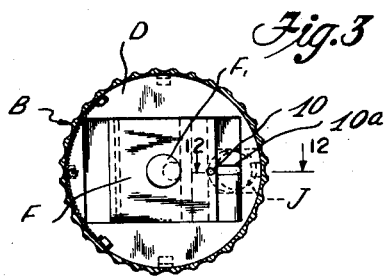
Fig. 3 is a plan on line 3—3 of Fig. 1.

Reverting to Fig. 2, it may be noted that the image I shows on imitation of a bounding ball on a table or other surface, the illusion thereby being occasioned by relative movement of the screen or image I and lamp L.

In Figs. 16 to 22, inclusive, I have shown a multiple type of projector embodying my principle of displaying pictures, in which a compartmented pedestal, a carrier and a plurality of separated lamps are arranged so that the light from each lamp will be separately directed upon and through individual portions $F_1$ of the same or corresponding portions of the image I. For instance, in Fig. 17, I have illustrated a single image sheet showing a group of dogs, while the accompanying screen has one deformation $F_1$ for each dog and the pedestal encloses a separate movable lamp for each dog. Thus, one dog may appear to move his head, another a leg, another a tail and the fourth one his ear, as the lamps L are moved. Of course, the disposition of the deformations $F_1$ and of screen F corresponds to the subdivisions of the image and lamps L.

As shown in Figs. 16 and 18, the interior of pedestal B is subdivided into light proof compartments 30, 31, 32 and 33 in which there is an individual lamp L associated with a bulb $F_1$ on screen F. The pedestal also has a bottom compartment 34 in which a motor $M_2$ is housed for applying motive force to a driving mechanism effective for moving the lamps in desired paths relative to the image sections and the screen bulbs $F_1$.

The driving mechanism for the lamps L may include a block 40 for each lamp, suitably fixed to a horizontal partition 41 of the pedestal and having an elongated chamber 42 therein which supports a longitudinally movable slide 43. Each of said blocks has a detachable cover 44 affixed thereto, formed with a slot 45 through which a stem 46 extends from a lamp socket 47 and the associated slide 43, and also through a slot 48 in partition 41, in order to permit the movement in a desired direction.

Each lamp L is driven by a separate gear—the lamps in compartments 31, 32, 33 and 34, respectively, by gears 50, 51, 52 and 53, and necessary idler gears, as at 54 and 55, as shown in Figure 19. Thus, the gear train connecting all of the lamps is completed and operative, and any one of said gears may be directly connected with the spindle of motor $M_2$ or with an interposed driving medium.

Each lamp motivating gear, as at 52 in Fig. 20, has a crank 56 pivoted at 57 and at its opposite end to stem 46 of its associated lamp L so that as the gear is rotated, the lamp will be moved relative to its supporting block 40. The ratio of the gears 50, 51, 52 and 53 may be varied to produce diversified movements of the lamps, and other changes in the driving mechanism and disposition of the lamps and associated parts and connections may also be changed selectively to produce different effects.

It may be noted that the lamps are all located above partition 41, while the driving mechanism is therebelow in compartment 34.

I may arrange the images, screens and lamp as diagrammatically shown in Fig. 22, in which combined image and screen units N, $N_1$ and $N_2$, each with a separate movable lamp L, are so disposed as to focus the light from the different light sources at a common point on reflector G for projection through lens H. By such means, complementary images may be consolidated and rendered viewable to observers for producing novel effects.

In Fig. 5 is shown a projector particularly adapted for projecting intermittently movable images such as may be carried by a film 60 wound on reels 61 and 62 and operating over rollers 63 and 64, so as to move successive images relative to the screen F. The film may be actuated in any suitable manner, and driven by a motor $M_3$ and a chain, belt or gear chain connecting said motor with one of the reels 61 or 62. The movement of film 60 relative to stationary screen F will afford the same effect as is produced by other mechanisms herein described.

The essence of my invention, therefore, is in the provision of an optical viewer, which, while subject to minor variations in its application to use for different purposes, employs the underlying principle, and means therefor, of displaying flat still or motion pictures so as to present an illusion of movement of parts of the projected image, thereby lending depth and at the same magnifying the image and affording to viewers thereof an impression that the image is suspended in space.

It will be understood that in an apparatus embodying my invention the light from a source is not refracted as by means of lenses or prisms but is deflected by means of deformed areas F' of the light transmitting screen F which is positioned between the light source and an observer in a plane immediately adjacent to the flat image I. Thus, as shown in Figs. 13, 14, and 15, the angle of incidence of the light is changed as the image I and screen F are moved one relative to the other.

I claim:

1. An optical viewer comprising: a light-proof housing formed with a lighted compartment and a projection compartment, an apertured partition separating said compartments, an image and a translucent screen adjacently supported on said partition, one of which is movable relative to the other, a lamp mounted in one of said compartments, a reflector mounted in said other compartment, a lens in the wall of the second compartment having a focal axis disposed at a substantial angle relative to central rays emanating from said lamp, said screen having one or more deformed protrusions overlying portions of the image, and means for relatively moving the image, screen and lamp for deflecting the light rays through the protruding portions of the screen and directing the same upon the reflector and from thence to and through the lens for simulating animation of the image when viewed from points etxernally of the lens.

2. An optical viewer comprising: a light-proof housing formed with a lighted compartment and a projection compartment, an apertured partition separating said compartments, an image and a translucent screen adjacently supported on said partition, one of which is movable relative to the other, a lamp mounted in one of said compartments, a reflector mounted in said other compartment, a lens in the wall of the second compartment having a focal axis disposed at a substantial angle relative to central rays emanating from said lamp, said screen having one or more deformed protrusions overlying portions of the image, and means for relatively moving the image, screen and lamp for deflecting the light rays through the protruding portions of the screen and directing the same upon the reflector and from thence to and through the lens for simulating animation of the image when viewed from points externally of the lens, and means for simultaneously rotating the reflector and the lens for rendering the projected image viewable by observers throughout a given range of viewability.

3. An optical viewer comprisng: a housing, a source of light therein, a projector head mounted thereon, a reflector carried by said head, a projector lens also carried by the head and in optical alinement with said reflector, an image and a light transmitting element mounted between the source of light and the reflector, and means for selectively and relatively moving the source of light, the image and the light transmitting element singly or in pairs for directing light from portions of the image to different points on the reflector whereby the projected light through the lens lends depth and illusion of movement to viewers of the projected image, said light transmitting element having one or more portions deformed from the normal plane thereof for deflecting the light from a source when directed therethrough.

4. An optical viewer as characterized in claim 3, including: means for rotatably supporting the viewer head on the housing so as to vary the angle of observation by viewers of the animated image.

5. An optical viewer comprising: a housing, a source of light therein, a projector head mounted thereon, a reflector carried by said head, a projector lens also carried by the head and in optical alinement with said reflector, an image and a light transmitting element mounted between the source of light and the reflector, and means for selectively and relatively moving the source of light, the image and the light transmitting element singly or in pairs for directing light from portions of the image to different points on the reflector whereby the light directed through the lens lends depth and illusion of movement to viewers of the image, said light transmitting element having one or more portions deformed from the normal plane thereof for deflecting the light from a source when directed therethrough, said lens serving to enlarge the image and afford a simulation of suspension in space.

6. An optical viewer comprising: a light housing, a head supported thereon, a partition separating the light compartment of the housing and the projecting compartment of the head, a light source in the housing, optical elements in the head for receiving and projecting an image, an image and a screen carried by said partition, and means for selectively moving the image, the screen and the light source, said screen having deformed protrusions between the image and the optical elements of the head whereby the viewed image simulates movement of the parts thereof adjacent said protrusions.

7. An optical viewer comprising: a light housing, a head supported thereon, a partition separating the light compartment of the housing and the projecting compartment of the head, a light source in the housing, optical elements in the head for receiving and projecting an image, an image and a screen carried by said partition, and means for selectively moving the image, the screen and the light source, said screen having deformed protrusions between the image and an observer simulating motion of parts of the image after said protrusions, and means for rotating the projector head relative to said housing during the selective movement of the image, screen and lamp.

8. An optical viewer comprising: a case, an image carried in a fixed plane in the case, a lamp supported in the case for movement in a plane parallelling but spaced from the image plane for illuminating the image at different angles of incidence, a translucent screen supported adjacent the image and having areas thereof overlying parts of the image deformed and protruding in the direction of an observer and through which the illuminated image may be viewed, the movement of the lamp serving to afford a simulation of movement of the parts of the image adjacent the protruding areas of the screen, and means on the case for directing the illuminated image to a plane viewable by an observer.

9. An optical viewer comprising: a case, an image carried in a fixed plane in the case, a lamp supported in the case for movement in a plane parallelling but spaced from the image plane for illuminating the image at different angles of incidence, a translucent screen supported adjacent the image and having areas thereof overlying parts of the image deformed and protruding in the direction of an observer and through which the illuminated image may be viewed, the movement of the lamp serving to afford a simulation of movement of the parts of the image adjacent the protruding areas of the screen, and means for selectively moving said image, said screen, and said lamp for changing the angle of incidence of the light relative to said image and screen.

References Cited in the file of this patent

UNITED STATES PATENTS

| | | |
|---|---|---|
| 521,064 | Weyde | June 5, 1894 |
| 1,498,064 | Apfelbaum | June 17, 1924 |
| 1,537,909 | Wolter | May 12, 1925 |
| 1,762,932 | Michalgy | June 10, 1930 |
| 1,803,596 | Craig | May 5, 1931 |
| 1,829,113 | Schreiber | Oct. 27, 1931 |
| 1,849,036 | Ernst | Mar. 8, 1932 |
| 1,869,276 | Precourt | July 26, 1932 |
| 1,895,690 | Stoefen | Jan. 31, 1933 |
| 2,083,600 | Gubish | June 15, 1937 |
| 2,110,813 | O'Kelly | Mar. 8, 1938 |
| 2,174,194 | Nemnick | Sept. 26, 1939 |
| 2,314,222 | Konig | Mar. 16, 1943 |